US011374756B1

(12) United States Patent
Myers et al.

(10) Patent No.: US 11,374,756 B1
(45) Date of Patent: Jun. 28, 2022

(54) TRACKING APPAREL ITEMS USING DISTRIBUTED LEDGERS

(71) Applicant: CreateMe Technologies LLC, New York, NY (US)

(72) Inventors: Thomas C. K. Myers, San Francisco, CA (US); Lawrence Charles Hume, London (GB); Eduardo Barrón, Los Angeles, CA (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/373,639

(22) Filed: Jul. 12, 2021

(51) Int. Cl.
*H04L 9/32* (2006.01)
*H04L 9/08* (2006.01)
*G06K 7/14* (2006.01)
*G06F 1/16* (2006.01)

(52) U.S. Cl.
CPC ............ *H04L 9/3213* (2013.01); *G06F 1/163* (2013.01); *G06K 7/143* (2013.01); *H04L 9/0819* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 7,042,335 B2 | 5/2006 | Franks | |
| 7,624,928 B2 | 12/2009 | Kimura et al. | |
| 8,893,418 B1 * | 11/2014 | Yochum | A41D 27/08 2/244 |
| 9,594,993 B2 | 3/2017 | Picard et al. | |
| 9,686,499 B2 | 6/2017 | Ekambaram et al. | |
| 10,275,739 B2 | 4/2019 | Hanis et al. | |
| 10,505,726 B1 | 12/2019 | Andon et al. | |
| 2004/0054888 A1 | 3/2004 | Chester | |
| 2004/0172537 A1 | 9/2004 | Baus et al. | |
| 2014/0122889 A1 * | 5/2014 | Freund | G01S 19/14 713/176 |
| 2014/0198096 A1 * | 7/2014 | Mitchell | G06T 19/006 345/419 |
| 2015/0058202 A1 | 2/2015 | Dahaeck | |
| 2015/0248678 A1 | 9/2015 | Wee et al. | |
| 2016/0078452 A1 | 3/2016 | Haslerig | |

(Continued)

*Primary Examiner* — Taghi T Arani
*Assistant Examiner* — Joshua Raymond White
(74) *Attorney, Agent, or Firm* — Kilpatrick Townsend & Stockton LLP

(57) ABSTRACT

Methods and systems enabling tracking and managing apparel items are described. The apparel item (e.g. clothing item, shoes, accessories, jewelry and other type of wearables) is tagged and tracked using an inimitable identification tag that is at least partially invisible to the naked human eye, and generating a record of the apparel item in a distributed ledger using the tag data of the inimitable identification tag. The record is associated with a non-fungible token (NFT) on the ledger that allows for tracking the item throughout its life. For example, it is possible to locate and authenticate the apparel item by using the private key associated with the NFT of the token. The apparel item may be tracked starting from a manufacturing phase of the apparel and extending throughout the lifespan of the apparel item. The authenticity of the apparel item can be shown throughout the manufacturing, distribution and ownership stages.

14 Claims, 6 Drawing Sheets

(56) References Cited

U.S. PATENT DOCUMENTS

| | | |
|---|---|---|
| 2017/0017966 A1 | 1/2017 | Montalban |
| 2017/0331896 A1 | 11/2017 | Holloway et al. |
| 2019/0366475 A1 | 12/2019 | Scarselli et al. |
| 2019/0394026 A1 | 12/2019 | Bookman et al. |
| 2020/0057876 A1 | 2/2020 | Chang |
| 2020/0210946 A1 | 7/2020 | Goodwin |
| 2020/0213121 A1 | 7/2020 | Hioki |
| 2020/0265446 A1* | 8/2020 | Vargas ............... G06K 7/10297 |
| 2020/0273048 A1* | 8/2020 | Andon ................ G06F 16/7837 |
| 2021/0103938 A1* | 4/2021 | Bulawski .............. H04W 12/47 |
| 2021/0248653 A1* | 8/2021 | McKenzie ............ G06F 21/645 |
| 2021/0256070 A1* | 8/2021 | Tran .................. G06F 16/90332 |

\* cited by examiner

US 11,374,756 B1

TRACKING APPAREL ITEMS USING DISTRIBUTED LEDGERS

BACKGROUND

In economic theory, scarcity is associated with high value. Luxury goods manufacturers rely on this principle to increase the value of their products. Some luxury goods manufacturers go as far as creating artificial scarcity by producing a limited number of certain goods to create the impression of scarcity, uniqueness, and/or high value. However, the high value attracts counterfeiting.

Counterfeiting and copycats costs the fashion industry billions in lost revenue. Despite the fact that under US laws copyright and trademark violations are criminal acts and could result in large criminal and civil penalties, the economics of counterfeiting is so attractive that despite the large penalties and risk of imprisonment, wholesale counterfeiting operations still persist.

Current systems do not allow for authenticating and tracking an apparel item throughout its lifespan. For example, when acquiring (e.g. buying for a first time or buying as a used item) the apparel item, it is not possible to determine whether the apparel was actually manufactured by the brand the seller asserts it is. It is also not possible to determine whether the seller is the legal owner or custodian of the apparel item. Therefore, existing systems do not allow for authenticating the apparel item to a satisfactory degree.

Embodiments address this and other problems, individually and collectively.

BRIEF SUMMARY

This disclosure relates to technologies enabling tracking and managing apparel items. More specifically, the present disclosure provides methods and systems for tagging and tracking an apparel item (e.g. clothing item, shoes, accessories, jewelry, watches, sunglasses and other type of wearables) starting from a manufacturing phase of the apparel and extending throughout the lifespan (e.g. existence) of the apparel. Using the technologies disclosed herein, it is possible to track authenticate articles (apparel items) throughout the manufacturing, distribution and various ownership stages.

Some embodiments provide a method for tracking and managing apparel items. The method includes affixing, by an apparel system, an inimitable identification tag to an apparel item such that the identification tag is irremovable without destroying the apparel item, wherein the identification tag is invisible to naked human eye on the apparel item. The identification tag includes tag data that uniquely identifies the apparel item. The apparel system generates a record of the apparel item in a distributed ledger, the record including. The record includes the tag data. The apparel system generates a non-fungible token associated with the apparel item on the distributed ledger record. The apparel system transmits a private key of the non-fungible token to an actual owner of the apparel item. The record of the apparel item on the distributed ledger is updated at one or more steps in manufacturing or distribution processes. The apparel system tracks one or more of a location, a custody and an ownership information associated with the apparel item.

Various embodiments provide a system for tracking and managing apparel items that includes a printing system and a tagging system. The printing system is configured to affix an inimitable identification tag to an apparel item, wherein the identification tag is invisible to naked human eye on the apparel item. The identification tag includes tag data that uniquely identifies the apparel item. The tagging system includes a processor and a memory storing executable instructions that, when executed by the processor, cause the processor to: generate a record of the apparel item in a distributed ledger, the record including. The record includes the tag data. The instructions, when executed by the processor further cause the processor to generate a non-fungible token associated with the apparel item on the distributed ledger record, and transmit a private key of the non-fungible token to an actual owner of the apparel item. The record of the apparel item on the distributed ledger is updated at one or more steps in manufacturing or distribution processes, such that the instructions, when executed by the processor, cause the processor to track one or more of a location, a custody and an ownership information associated with the apparel item.

In some embodiments, a method for tracking and managing apparel items is provided. The method includes manufacturing, by a manufacturing system, an apparel item. The method further includes printing, by the manufacturing system, an inimitable identification tag to the apparel item using invisible ink. The identification tag includes tag data that uniquely identifies the apparel item. The identification tag is part of a set of identification tags that can only be read using a scanning system configured by the manufacturing system to read the set of identification tags. The method further includes generating, by the manufacturing system, a record of the apparel item in a distributed ledger, the record including. The record includes the tag data. The manufacturing system generates a non-fungible token associated with the apparel item on the distributed ledger record, and transmits a private key of the non-fungible token to an actual owner of the apparel item. The method also includes tracking, by the manufacturing system, one or more of a location, a custody and an ownership information associated with the apparel item during or post manufacturing phase of the apparel item.

In some embodiments, multiple layers of security and anti-counterfeiting protection using the systems and methods described above. A first layer among the multiple layers of security and anti-counterfeiting protection is provided by an invisible tag. The tag also provides a second layer of security as it is inimitable and cannot be removed from an apparel item without destroying the apparel item. The identification tag includes data that uniquely identifies the apparel item through a non-fungible token (NFT). A third layer of protection also provides decryption of at least part of the information on the invisible tag which renders the tag undecipherable even if the invisible tag could be viewed by some means. A fourth layer of protection is provided by tag readers that are specifically programmed or otherwise configured to read a given family of tags. The tag readers may be customized to match a single brand, or a group of brands. A fifth layer of protection is provided using blockchain to record the transactions including the apparel item. A sixth layer of protection is provided using an NFT associated with the apparel article. The NFT links the blockchain record to the physical article because it is associated uniquely to a single physical article or apparel item. A seventh layer of protection is provided by the use of a private key in the custody of the legal owner of the apparel item. The private key is required for any update to entries about the apparel item in the blockchain. An eighth layer of protection is provided by the use of smart contracts and/or NFT to manage rights and/or tally royalties of the apparel item (e.g. when the apparel item is a scarce item that requires artist royalty for each genuine apparel item sold). A ninth layer of protection is provided by the use of the NFT to track the count of serial numbers associated with genuine apparel items, and to prevent fraud by counterfeiters or manufacturers. The layers of security provided by the embodiments may include one or more security layers described above. Various embodiments may provide more or less security and anti-counterfeiting protection that the layers enumerated above. The numbering of the layers is not indicative of an order and is simply provided for enumeration and illustration purposes. Different layers of security may become more or less important depending on the apparel item, the manufacturer, the user, etc. However, it should be clear that each layer of security provided is cumulative and provides additional security against counterfeiting and additional features for tracking and authenticating apparel articles.

Additional features, benefits, and embodiments are described below in the detailed description, figures, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
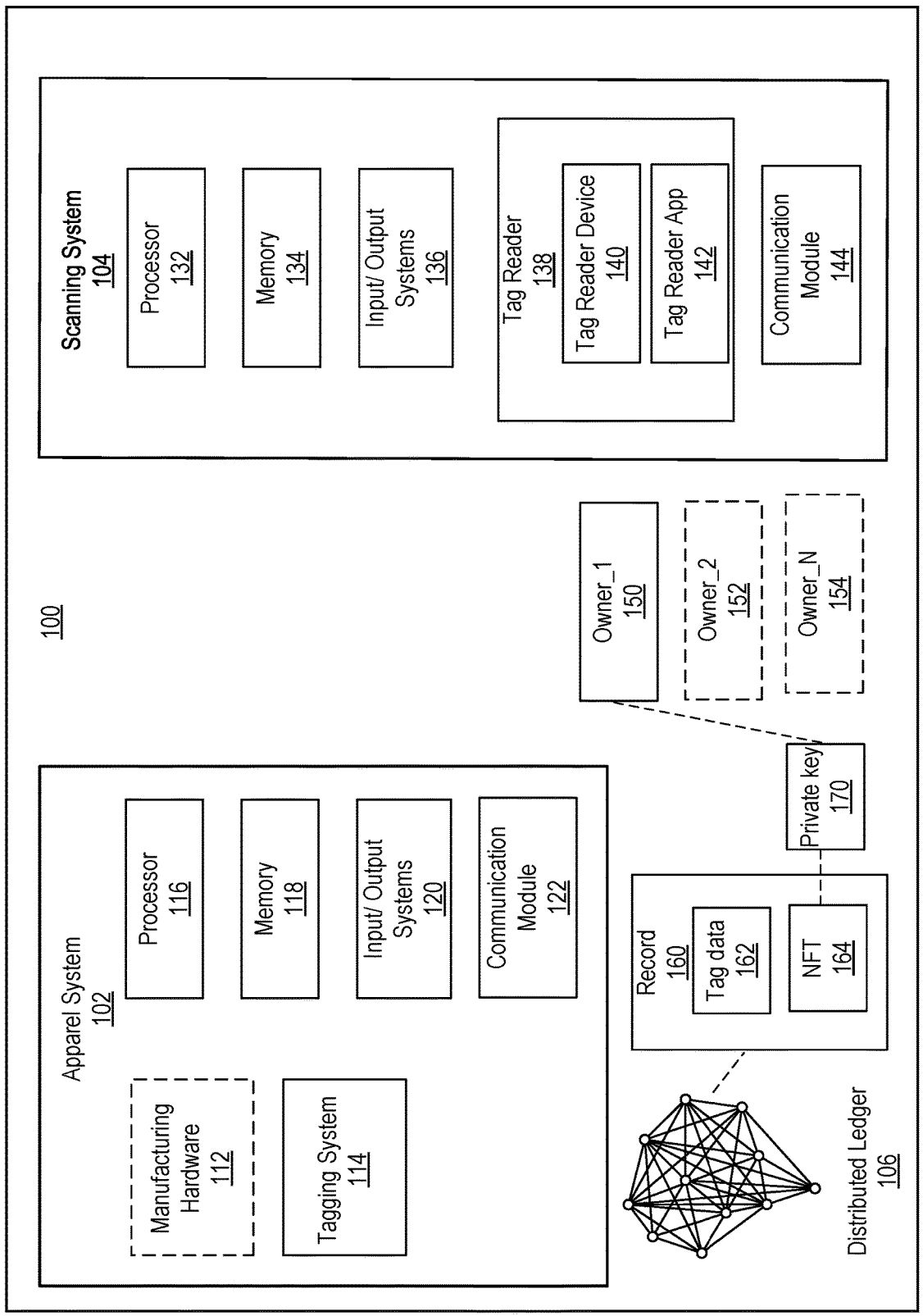
FIG. 1 illustrates an exemplary garment manufacturing and distribution environment, according to various embodiments.

Embodiments provide systems and methods for tracking and managing apparel items. More specifically, embodiments provide technologies for tagging an apparel item (e.g. any clothing item, shoes, jewelry, any type of wearable item) using an inimitable identification tag that is at least partially invisible to the naked human eye and/or under normal lighting conditions, and generating a record of the apparel item in a distributed ledger using the tag data of the inimitable identification tag. According to various embodiments, the identification tag is irremovable without destroying the apparel item. That is, an attempt to remove the identification tag from the apparel item may render the apparel item non-usable. A non-fungible token (NFT) is associated with the apparel item on the distributed ledger record that allows for tracking the item throughout its lifespan. For example, it is possible to locate and authenticate the apparel item by using the private key associated with the NFT of the token. When the apparel item is sold to an owner, the private key may also be passed to the buyer. This way, the buyer becomes the lawful owner and custodian of the apparel item. In some embodiments, the private key may first pass from the manufacturer to the first purchaser of the apparel item. In such embodiments, the entities (e.g. wholesalers, retailers) between the manufacturer and the first purchaser may become the custodian of the apparel item without becoming a rightful owner. In other embodiments, when the apparel item leaves the manufacturer's custody, the manufacturer may choose to transfer the private key to the custodian of the apparel item, therefore making the custodian also the legal owner of the apparel item.

According to an exemplary embodiment, a clothing item may be tagged with the inimitable identification tag (e.g. a smart label) using a tagging system. In some embodiments, the tagging may be done by laser etching, engraving or similar methods to create an inimitable tag on articles such as sunglasses, watches, etc. In some embodiments, the laser etched tagging may be invisible to the naked eye. In some embodiments, the tagging may include watermarks and encryption rendering any reproduction of the invisible tag difficult or impractical. In some embodiments, the tagging system may be operated by the manufacturer, and therefore the clothing item may be tagged during clothing manufacturing operations. In other embodiments, the tagging system may be operated by entities downstream from the manufacturer, such as by a wholesaler, a retailer or an entity performing customization work (e.g. adding embellishments, applying a chemical or physical processing) on the apparel item. The tagging system may be provided to these entities by the manufacturer in the form of hardware and/or software. The tagging system may include a printer system that is configured to permanently affix the inimitable identification tag to the clothing item in any suitable manner. One of ordinary skill in the art will know various methods for affixing a tag to textile items. Textile as used herein may include woven, as well as recycled, materials such as recycled plastic, recycled cotton, among others.

The inimitable identification tag may be printed on the clothing item using invisible ink such that at least a portion of the inimitable identification tag is invisible to the naked human eye. In some embodiments, the inimitable identification tag may be printed in the form of a quick response (QR) code that includes tag data in an encrypted format. The QR code may include at least a portion that stores additional data associated with the apparel item. In some embodiments, the inimitable identification tag may be readable only using a corresponding exclusive tag reader. For example, the tag reader may be specific to a set of tags (e.g. tags associated with a brand, or a collection (e.g. seasonal collection) of the brand). The tag reader may be provided by the manufacturer to entities such as retailers, wholesalers or even individuals in the form of hardware and/or software. In some embodiments, the tag reader may be provided in the form of a software application (e.g. an app). A tag reader device may store one or more tag reader applications that can read identification tags associated with different brands or different collections of the same brand. In some embodiments, the tag reader device may be specific to a subset of identification tag, such that the tag reader may only read a certain type of tags (e.g. tags associated with a specific brand only).

When the tag reader scans the tag affixed to the apparel item, the tag reader collects tag data from the tag. The tag data is then communicated to a system that can match the tag data with a record on a distributed ledger. Once matched, the apparel item may be tracked back to the manufacturer and to the current lawful owner and/or custodian of the apparel item.

FIG. 1 illustrates an exemplary garment manufacturing and distribution environment 100 according to various embodiments. The garment manufacturing and distribution environment 100 may include an apparel system 102, a scanning system 104, a distributed ledger 106, and one or more owners 150, 152, 154. As shown in FIG. 1, the owners 152 and 154 are illustrated with broken lines and may not be part of the garment manufacturing and distribution environment 100 (e.g. the apparel item is only purchased and owned by a single owner 150).

The apparel system 102 may be one or more of a manufacturer, a wholesaler, a distributer, a retailer or any entity who is a legal custodian of an apparel item such as an entity that receives and customizes the apparel item by adding or removing parts thereof or adding embellishments, ornaments, etc. In some embodiments, the apparel system 102 may include manufacturing hardware 112, for example when the apparel system 102 is the manufacturer of the apparel item. The manufacturing hardware 112 may also include hardware that is used to alter or otherwise customize an existing apparel item. In some embodiments, an entity that customizes an existing apparel item may be considered the manufacturer of the final (i.e. customized) apparel item.

The apparel system 102 may include a tagging system 114 configured to affix an inimitable identification tag ("tag") to the apparel item. At least a portion of the identification tag may be invisible to naked human eye on the apparel item. The identification tag includes tag data that uniquely identifies the apparel item. For example, the tagging system may include printer hardware configured to print or otherwise permanently affix a tag to the apparel item using invisible ink. In some embodiments, the printer hardware may only use invisible ink such that the entire tag is invisible to the naked human eye. In other embodiments, the printer hardware may also use other type of ink or dye such that a portion of the tag is invisible to the naked human eye. As used herein, the term "invisible" may exclude markings that can be seen with magnification. According to various embodiments, the tag may include tag data in an encrypted form. As such, the invisible identification tag may store encrypted tag data. As such, even if the tag can be seen by naked eye, or read by a reader, the tag information is undecipherable because of the incorporated encryption.

The apparel system may further include a processor 116 (e.g. first processor) and a memory 118 (e.g., RAM, DRAM, EEPROM, etc.) coupled to the processor 116. The memory 118 (e.g. first memory) may store executable instructions that, when executed by the processor 116 may cause the processor 116 to generate a record of the apparel item in the distributed ledger 106. The record may include the tag data. The tag data may also be stored (e.g. in an encrypted form) in the tag affixed to the apparel item. The instructions, when executed by the processor 116 may further cause the processor 116 to generate a non-fungible token associated with the apparel item on the distributed ledger record, transmit a private key of the non-fungible token to an actual owner of the apparel item. The record of the apparel item on the distributed ledger is updated at one or more steps in manufacturing or distribution processes, such as one or more of a change of custody, a change of location, or a change of ownership. According to various embodiments, the distribution process as used herein may include the transfer of the apparel item from the manufacturer to the wholesaler or the retailer, from the retailer or manufacturer to a first owner, or from one owner to another owner (e.g. after the first sale of the apparel item). This way, it is possible to track and/or authenticate various information about an article, such as one or more of a location, a chain of custody and an legitimate ownership of the apparel item at any given time.

According to various embodiments, the record 160 of the apparel item on the distributed ledger 106 may include information on one or more of a provenance, a location, an ownership, a date of first sale, a first buyer information, or a transaction history associated with the apparel item. When the record 160 is created on the distributed ledger 106, a non-fungible token (NFT) 164 may also be generated and/or assigned to the apparel item.

An NFT is a cryptographic token that represents a unit of data on a digital ledger. A given NFT represents a unique item (e.g. an apparel item), and is not interchangeable with another NFT. Identification codes and metadata associated with NFTs distinguish them from each other. When the NFT represents a physical item (e.g. an apparel item), the NFT acts as a non-duplicable digital certificate of ownership of that physical item. The NFT includes code (e.g. a signature) from its creator that authenticates the NFT on any server, browser or platform. The NFT is verifiable on a distributed ledger, in a decentralized way.

According to various embodiments, the NFT 164 may be associated with a private key 170 that is transferred to the owner of the apparel item. The private key (and the NFT 164) may attest to the authenticity of the apparel item and its real/legitimate owner. While embodiments described herein are directed to assigning ownership of the apparel item and the NFT at the same time, it is also envisioned that the NFT may have a value on its own and/or may be transferred separately from the physical ownership of the apparel item. For example, owner_1 150 may be the first purchaser of the apparel item. The owner_1 150 may acquire the physical custody of the apparel item, as well as the private key for the NFT 164. At a later time, the owner_1 150 may wish to sell the apparel item to the owner_2 152. The owner_1 150 may transfer both the apparel item as well as the private key of the NFT 164 to the owner_2 152. In some embodiments, the owner_1 150 may transfer only one of the apparel item or the private key to the owner_2 152, and may transfer the other of the apparel item or the private key to the owner_3 154. In some embodiments, the owner_1 150 may transfer only the apparel item or the private key to the owner_2 152, and may transfer the ownership of a digital representation of the apparel item along with an associated NFT and private key to the owner_3 154. According to various embodiments, it is also possible to share ownership of the NFT among two or more owners by, for example, creating shares of the NFT and sharing different amounts of shares among the owners.

In some embodiments, the distributed ledger 106 may be a private ledger maintained and/or managed by the apparel system 102 (especially when the apparel system 102 represents the manufacturer of the apparel item). In other embodiments, the distributed ledger 106 may be a public ledger. According to various embodiments, the distributed ledger 106 may be implemented in any suitable system or platform, including but not limited to ETH, BINANCE, FLOW, TRON, EOS, POLKADOT, TEZOZ, COSMOS, and/or WAX.

The apparel system 102 may further include input/output systems 120 that enable the apparel system 102 to receive and output data. The input/output systems 120 may include one or more of a display, a touchscreen, keyboard, biometric sensors, etc. that are coupled to the processor 116.

The apparel system 102 may further comprise a communication module 122, coupled to the processor 116. The communication module 122 can include code, executable by the processor 116 to allow the apparel system 102 to communicate with other external devices (e.g. the scanning system 104, nodes of the distributed ledger 106). The communication module 122 may include or be coupled to one or more antennas for transmitting and receiving signals and/or data to and from external entities such as the scanning system 104, or nodes in the distributed ledger 106. The one or more antennas may be configured to communicate via, for example, a plurality of radio interfaces that may be coupled to the one or more antennas. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

The scanning system 104 may include a tag reader 138 paired with the tagging system 114. The tag reader 138 may be configured (e.g. by the tagging system 114 or the apparel system 102) to scan the identification tag to acquire the tag data. For example, the tag reader 138 may acquire the tag data from the tag in a contactless manner or via contact (e.g. by tapping the tag reader 138 to the tag). In some embodiments, the tag reader 138 may include a scanner that can scan a tag or acquire tag data from the tag using, for example, near field communication (NFC) technology.

As described above, the inimitable identification tag affixed to the apparel item using the tagging system 114 may be readably only using the corresponding tag reader 138. For example, the tag reader 138 may be specific to a set of tags (e.g. tags associated with a brand, or a collection of the brand). The tag reader 138 may be provided by the manufacturer to entities such as retailers, wholesalers or even individuals in the form of hardware (e.g. a tag reader device 140) and/or software (e.g. a tag reader application 142). In some embodiments, the tag reader device 140 may store one or more tag reader applications 142 that can read identification tags associated with different brands or different collections of the same brand. In some embodiments, the tag reader 138 may be specific to a subset of identification tag, such that the tag reader 138 may only read a certain type of tags (e.g. tags associated with a specific brand only). The tag reader 138 may be configured, by the apparel system 102, to read the set of identification tags.

The tag reader 138 may be in communication with a processor 132 (e.g. second processor) of the scanning system 104. The scanning system 104 may include the processor 132 and a memory 134 (e.g., RAM, DRAM, EEPROM, etc.) coupled to the processor 132. The memory 134 (e.g. second memory) may store executable instructions that, when executed by the processor 132 may cause the processor 132 to receive the tag data from the tag reader 138, transmit the tag data to the apparel system 102 (e.g. the processor 116 of the apparel system 102), and receive information associated with authenticity of the apparel item based on the tag data.

The scanning system 104 may further include input/output systems 136 that enable the scanning system 104 to receive and output data. The input/output systems 136 may include one or more of a display, a touchscreen, keyboard, biometric sensors, etc. that are coupled to the processor 132. The scanning system 104 may further comprise a communication module 144 (e.g. similar to communication module 122), coupled to the processor 132. The communication module 144 can include code, executable by the processor 132 to allow the scanning system 104 to communicate with other external devices (e.g. the apparel system 102, nodes of the distributed ledger 106).

As used herein, a "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

As used herein a "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Any suitable number or types of communication networks may be present between the computers and devices shown in FIG. 1. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
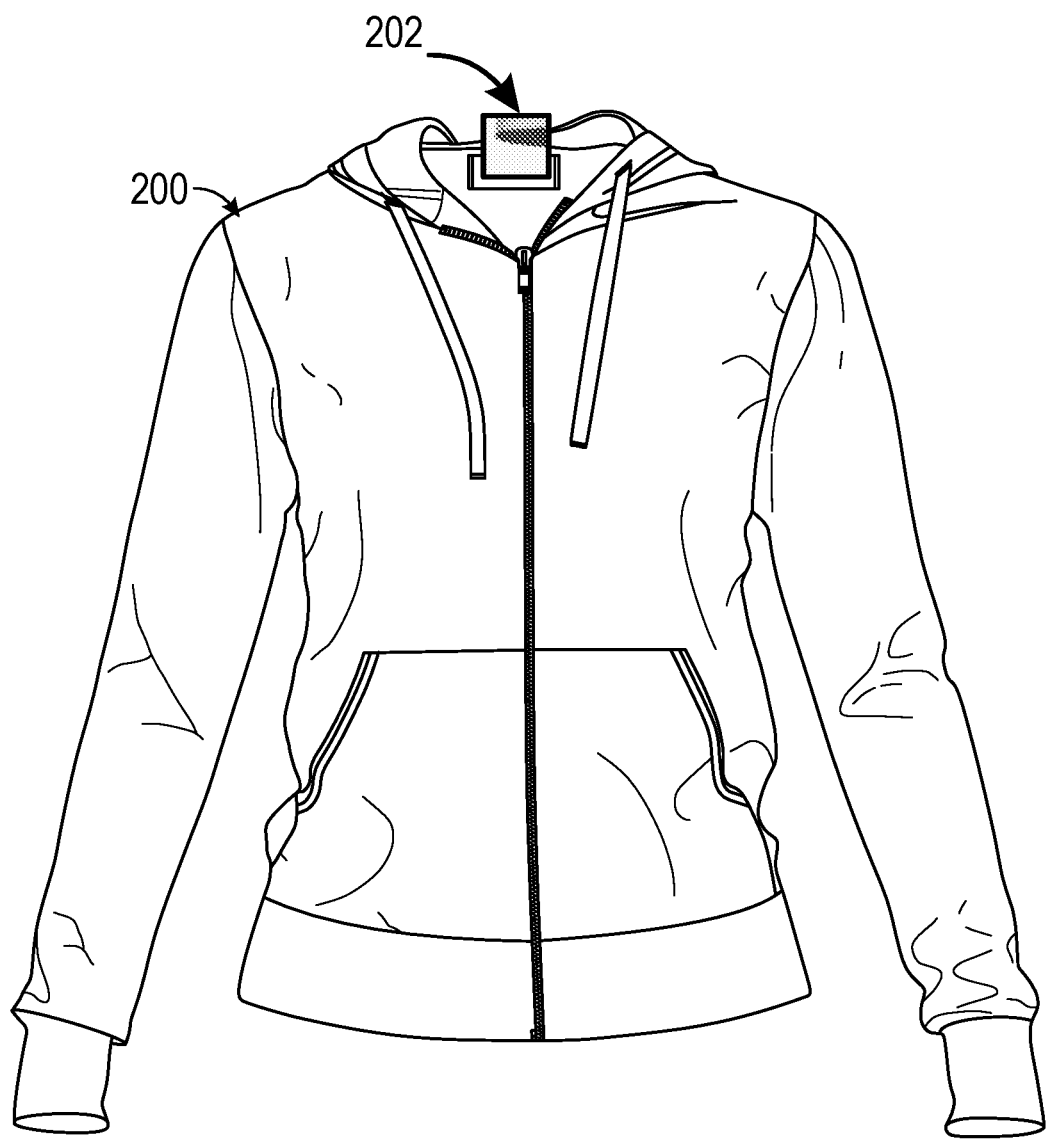
FIG. 2 illustrates an example of an apparel item bearing a tag in accordance with some embodiments.

FIG. 2 illustrates an example of an apparel item 200 bearing a tag 202 (e.g. a smart label, an inimitable identification tag) in accordance with some embodiments. The apparel item 200 may represent a simple brand name jacket, or may represent an expensive brand name jacket manufactured in limited quantity. In the former case, copycats may present a large economic threat to the manufacturer. In the latter case, counterfeiting may be the biggest economic threat the luxury manufacturer has to deal with. In accordance with some embodiments, in either the case of a desirable brand name product as in the case of limited production, luxury good article, the tag 202 shown on collar of the apparel item 200 may be used to identify, serialize and help track and authenticate the apparel item 200 as being a genuine article. The tag 202 may be an inimitable identifier tag that uniquely identifies the apparel item 200 and is impossible to separate the tag 202 from the apparel 200 without destroying or damaging one or both.

According to some embodiments, the tag 202 may be affixed to the apparel item 200 during manufacturing phase, by the manufacturer of the apparel item 200. In other embodiments, the tag 202 may be affixed to the apparel item 200 by other entities downstream from the manufacturer such as the wholesaler, the distributor, the retailer or an entity that customizes the apparel item 200 by, for example, affixing embellishments in addition to the tag 202 on the apparel item 200.

The tag 202 may be affixed to the apparel item 200 using any suitable techniques including but not limited to printing (e.g. direct printing, discharge printing, resist printing, digital printing, burn-out printing, roller printing, block printing, heat-transfer/reactive printing, pigment printing), sewing a pre-printed tag, dye sublimation, laser marking, laser engraving, etc. Regardless of the affixing method, the tag 202 may be created to be partially or fully invisible to the naked human eye and impossible to separate the tag 202 from the apparel 200 without destroying one or both. In some embodiments, at least a section of the tag 202 may be printed in invisible ink. In some embodiments, at least areas of the tag 202 may be created in such a manner to render its reproduction by any means difficult if not impossible. For example, invisible ink digital watermarks may be used to create at least a portion of the tag 202.

In some embodiments, the tag 202 may be in the form of a two-dimensional matrix barcode, such as a Quick Response (QR) code. QR codes have the advantage of being easily producible using a variety of commercially available applications. Specialized QR generators may be used to create QR codes that include irreproducible parts that are irreproducible either because the use technologies such as digital watermarks, or because all sections of the QR code or the anti-counterfeiting sections of the QR code can be in invisible ink and thus difficult to reproduce. Furthermore, QR codes can be serialized and used to keep count of the number of articles produced. In some embodiments, the tag data may be stored in the QR code in an encrypted manner. Accordingly, even if the QR code is copied or otherwise reproduced, the content may not be deciphered without the corresponding decryption algorithm and/or key that may be found only in the matching tag reader 138 programmed to read and decrypt the particular brand or manufacturer. The encryption feature adds a layer of security to the tag 202 in the QR form. In addition, the tag 202 may be produced as to be invisible to the naked human eye, at least under ordinary lighting conditions, (e.g. using invisible ink) thereby adding another layer of security against unauthorized reproduction of the tag 202.

According to various embodiments, the tag 202 (whether in the QR code form or otherwise) may be configured to be read/scanned only by a corresponding tag reader (e.g. tag reader 138 illustrated in FIG. 1). The tag reader 138 may be configured (e.g. by the tagging system 114 or the apparel system 102 in general) to scan the tag 202 to acquire the tag data. For example, the tag reader 138 may be specific to a set of tags (e.g. tags associated with a brand, or a collection of the brand) including the tag 202 affixed to the apparel item 200. Accordingly, the tag 202 may be part of a set of tags that can only be read using the tag reader 138 programmed to read the set of tags.

For example, the tag 202 may be specific to a brand, or a specific collection of a particular brand or to a specific manufacturer. In some embodiments, the tag reader 138 may need to be updated to scan different tags associated with different brands, or another collection of the same brand. For example, the tag reader 138 may be an app installed on a smart device (e.g. a smartphone, a tablet, a QR reader, etc.) of the user. The user may have multiple apps installed on the same device, each app representing a tag reader specifically programmed or otherwise configured to read a predetermined set of tags. Other embodiments may restrict having multiple tag reader apps on a same device, and may require a dedicated device for each tag reader.

According to some embodiments, the tag 202 may be provided in the form of a three-dimensional (3D) barcode that may be applied to the apparel item 200 as a part of the manufacturing process. The 3D barcode may include protrusions that can be determined by the corresponding tag reader. In some embodiments, the 3D barcode may include tags with an additional dimension for storing additional tag data.

Figure 3:
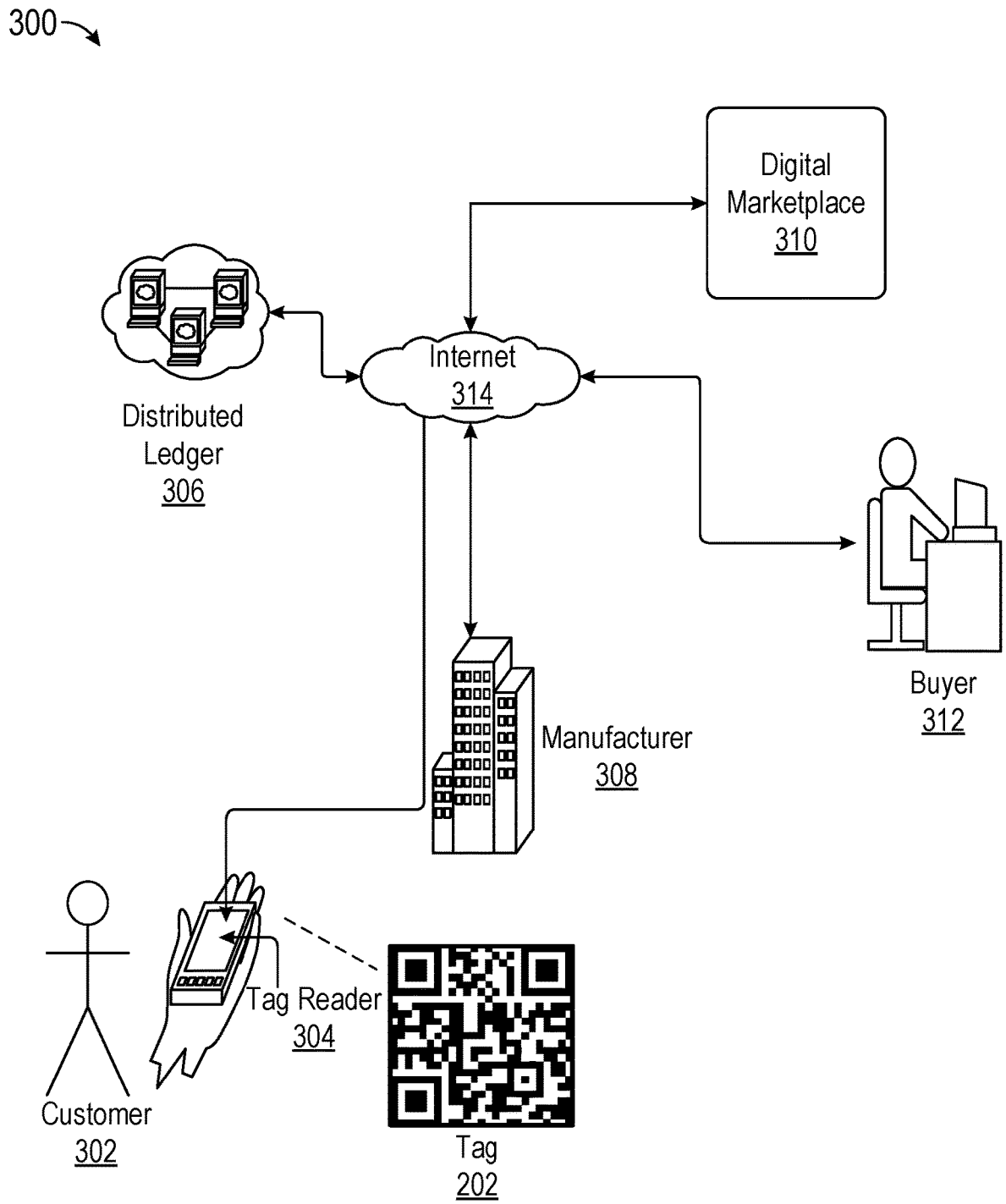
FIG. 3 illustrates an exemplary system configured for tracking and managing apparel items using distributed ledgers according to some embodiments.

FIG. 3 illustrates an exemplary system 300 configured for tracking and managing scarcity and authenticity of apparel items using distributed ledgers according to some embodiments. According to an exemplary embodiment, the tag 202 may be permanently affixed, by the manufacturer to render it non-removable, to the apparel item 200 during the manufacturing process of the apparel item 200. In this exemplary embodiment, the tag 202 may be in the form of a QR code, and may include at least a portion that is printed on the apparel item 200 using invisible ink.

The customer 302 may purchase the apparel item 200 from the manufacturer 308 or a retailer that is associated with the manufacturer 308. The customer 302 may request, and receive, from the manufacturer a tag reader 304 (e.g. a tag reader app) that is configured to read the tag 202 affixed to the apparel item 200. For example, the customer 302 may install the tag reader 304 on their user device. In some embodiments, the tag reader 304 may be installed on a tag reader device of the retailer and the customer 302 may require the assistance and the equipment of the retailer to perform the scan.

As described above, the manufacturer 308 may generate a record for the tag 202 in a distributed ledger 306 upon generating the tag 202. The manufacturer 308 may also generate a NFT 164 to represent the apparel item 200 on the distributed ledger. The NFT 164 may be associated with a private key 170 that can be assigned to entities to represent ownership of the NFT 164, which represents ownership of the apparel item 200. Transferring ownership of the NFT may require a blockchain transaction that is authorized only by the NFT owner's private key. For example, the NFT may be sold, or otherwise transferred in a digital marketplace 310 suitable for performing such transactions. While it is possible to transfer ownership of the NFT along with the physical item (e.g. the apparel item 200) associated with the NFT, it is also possible to assign a value to the NFT and transfer the NFT to a buyer 312 separately from the physical item it represents. According to various embodiments, selling the NFT, for example on the digital marketplace 310, may result in the manufacturer 308 earning resale royalties as the original creator of the NFT. As the creator of the NFT, the manufacturer can prove that they are the creator of the NFT and they determine the scarcity associated with the NFT, and in turn, with the apparel item 200.

Accordingly, embodiments provide for authentication of (confirmation that) an apparel item is genuine (as opposed to fake), and a confirmation that the current possessor of the apparel item is the legal and legitimate owner of the apparel item (e.g. that the apparel item is not stolen). This determination requires the holder of the private key to use it for all transactions or authentications of the genuine apparel item or its chain of custody.

Returning to the exemplary embodiment illustrated in FIG. 3, at the time of a transaction that may affect the ownership or custody of the apparel item 200, such as at the time of the purchase of the apparel item 200, as part of the transaction, a verification of the authenticity and chain of custody of the apparel item 200 may be performed. For example, when the tag 202 is scanned (e.g. read) by the tag reader 304, the tag reader device may retrieve and display the information associated with the apparel item 200. According to various embodiments, the tag data retrieved from the tag 202 may be transmitted to, and authenticated by, nodes in the distributed ledger 306. For example, the information may include one or more of the manufacturer name, the manufacturing date and time, a count of the apparel item out of a total number of apparel items produced by the manufacturer, any previous owners of the apparel item, among other information. Accordingly, the tag 202 may convey information about scarcity and authenticity of the apparel item. If the customer 302 proceeds to purchase the apparel item, the customer 302 may receive the apparel item as well as the private key associated with the NFT assigned to the tag 202.

In some embodiments, the system 300 may use the distributed ledger technology (e.g., blockchain technology) to further enhance the security of the system against counterfeiting. In some embodiments, the information scanned from the tag 202 may be compared to the record related to the apparel item 200 stored in the distributed ledger 306 to determine if the tag information belongs to the apparel item 200. The apparel item 200 and/or its tag information may be associated with a unique NFT that is further used to identify the authenticity of the apparel item. In some embodiments, as part of the information read from the tag 202 and transmitted to the distributed ledger 306 to verify that the apparel item is genuine, information about the provenance of the apparel item 200, the chain of custody, ownership, and other relevant information may be communicated to the system 300 that allows the system 300 to identify any break in the chain of custody which would flag a potential counterfeit item. In some embodiments, the tag information may be collected by special scanners that can read the tag information recorded in invisible ink on the tag 202. In some embodiments, attempts to counterfeit the genuine apparel item may include reproducing the tag information. Because at least part of the tag information is written in invisible ink or includes an inimitable digital watermark, the counterfeit tag would fail an authentication verification. In some embodiments, the records stored within the distributed ledger 306 may include the NFT that would be associated at least in part with some of the tag information recorded on the tag 202 in invisible ink. As a result, any attempt to authenticate a counterfeit or stolen article would fail for the secondary reason that the record stored in the distributed ledger 306 and the NFT may include information that when compared to reading of the tag 202 from a counterfeit or stolen article would fail because of missing or incorrect information. The distributed ledger is configured to store part of or the entire provenance of the apparel item by tracking the chain of custody while in manufacturing as well as after the first sale to the customer.

Any suitable number or types of communication networks may be present between the computers and devices shown in FIG. 3, such as the Internet 314.

Figure 4:
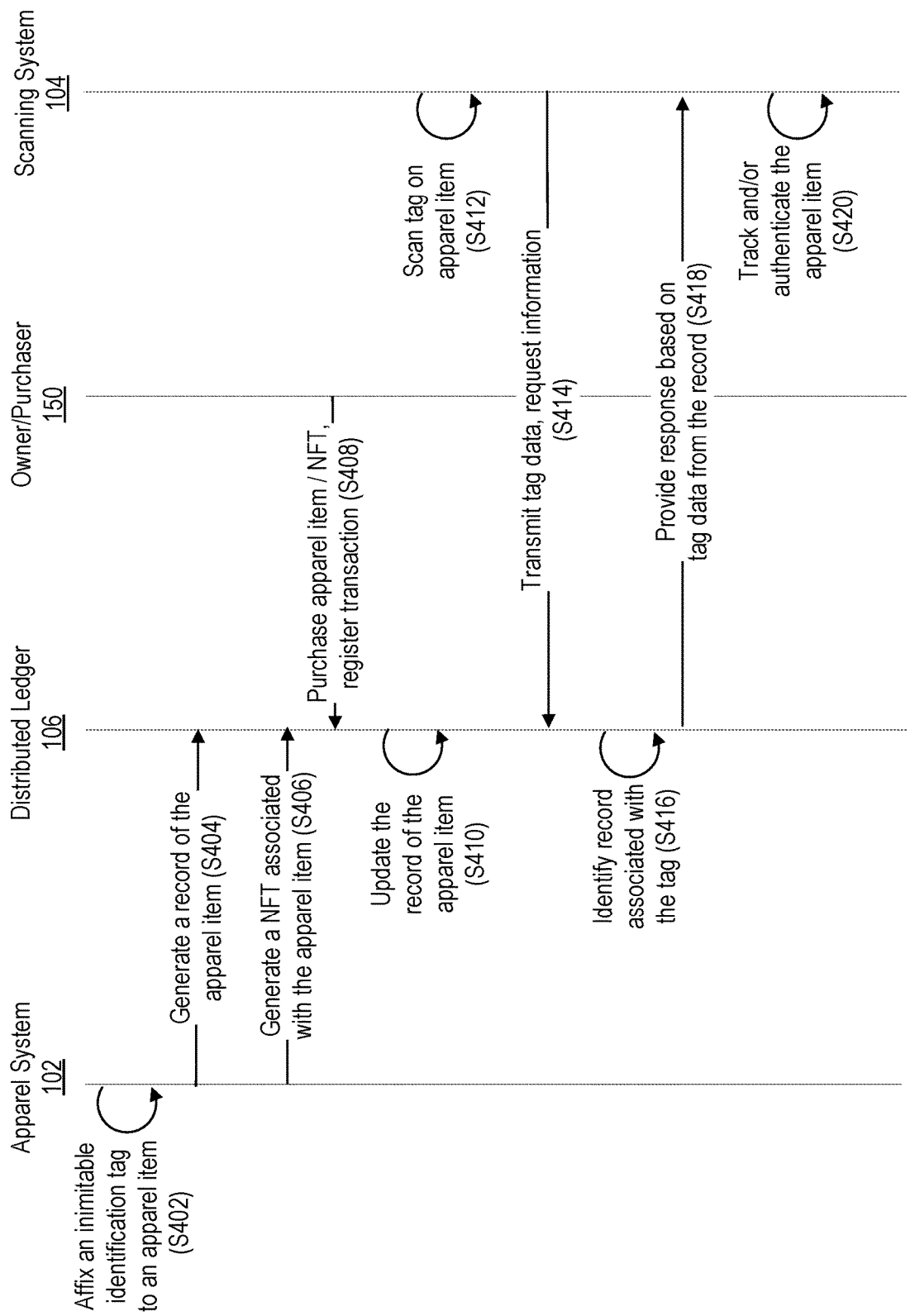
FIG. 4 illustrates an exemplary flowchart of steps performed by the entities in the exemplary garment manufacturing and distribution environment illustrated in FIG. 1.

FIG. 4 illustrates an exemplary flowchart of steps performed by the entities in the exemplary garment manufacturing and distribution environment 100 illustrated in FIG. 1. According to various embodiments, an apparel item (e.g. a clothing item, an accessory, shoes, jewelry or any type of wearable item) is manufactured by a manufacturer. The apparel system 102 illustrated in FIG. 4 may represent the manufacturer of the apparel item, or any other entity downstream from the manufacturer such as a wholesaler, a retailer or a customizing agent that is trusted with the custody of the apparel item, and that is commissioned to customize the apparel item. According to some embodiments, the customizing agent may include a contract manufacturer for various brand owners. The customizing agent may act as a trusted middleman between brand owners and artists. In some embodiments, the customizing agent may act as a trusted intermediary and keep track of royalties owed to artists based on the number of genuine apparel items made and delivered to the brand owner. For example, the customizing agent may keep track of limited edition articles of high value (e.g. 100 t-shirts imprinted with the authorized copies of a famous artist's painting, images, etc.) using the tagging and tracking (e.g. via distributed ledgers, NFTs) techniques described herein. The tracking and calculation of loyalty may be performed using smart contracts also known as self-executing contracts, where the terms of the agreement is incorporated in the software execution code. The automated nature of the self-executing contracts may provide additional assurance to licensors such as artists that they are protected and accurately compensated for their contribution. In some embodiments, one or more entities along the manufacturing chain including the manufacturer, the brand owner, distributors, the artists providing primary and customization designs or the customization agents of an article may impose restrictions in the use or resale of an article. For example, a brand owner may impose an anti-flipping requirement on its branded high value and/or scare goods by requiring the legal purchaser of a branded article not to resell the article, in the secondary market, within a period of time from the original purchase, or without express permission from the brand owner within a given period of time. Such restrictions provide additional controls to manufacturers and brand owners to protect their brand, by not only fighting counterfeits, but also through control of the secondary resale market for a luxury good or any article that derives part of its prestige and value from its scarcity. In some embodiments, a brand owner may limit access to service and repair for genuine owners of their branded article for violations of their post sale restrictions. In some embodiments, terms and conditions of any limitations imposed by the brand owner or manufacturer that may affect the use, value or transactability of an article may be recorded in the distributed ledger and may be converted into a recorded encumbrance against the branded article in case of a violation of restrictions, providing additional control to manufacturers and brand owners to protect the high value and scarcity of their branded articles.

At step S402, the apparel system 102 affixes an inimitable identification tag to the apparel item. According to various embodiments, at least a portion of the identification tag may be invisible to naked human eye on the apparel item. For example, the identification tag may be printed on the apparel item using invisible ink. The identification tag includes tag data that uniquely identifies the apparel item. In some embodiments, the identification tag may be invisible under visible light or invisible to naked eye. In some embodiments, the identification tag may include visible and invisible portions. In some embodiments, the visible and/or invisible portions of the identification tag may include irreproducible watermarks. In some embodiments, at least parts of the visible and/or invisible portions of the identification tag may be encrypted. In some embodiments, parts of the identification tag may be encrypted in a way to render them readable and decipherable only with a specialized custom tag reader. In some embodiments, the invisible tag may include a public key associated with the private key and NFT related to the genuine article. In some embodiments, the public key may be used to determine the authenticity of the article it is associated with. In some embodiments, brand owners may store public keys associated with their genuine articles. In some embodiments, the brand owner may permit third parties with the rights to access the brand owner's database of genuine articles in order to can authenticate the genuineness of the public key associated with an article, thus authenticating the article as a genuine item. In some embodiments, tag data may be accessed and queried solely based on the presentation of a public key associated with the private key and NFT that corresponds to the authentic article. In some embodiments, third party agents may provide the authentication service to customers for a fee. In some embodiments, in a transaction in the secondary market for a genuine article, the legal owner of an authentic article in possession of the NFT, private key and public key associated with a genuine article may provide the public key to an interested buyer to allow the buyer to for example, to access a brand owner's website and using the public key, verify the authenticity of the article based on its associated public key. In the same scenario, after the initial verification of the authenticity of the public key associated with a genuine article, the legal owner of the genuine article may sell the article to the interested buyer and transfer the ownership of the NFT and private key, and as part of the sale transaction, update the record in the distributed ledger associated with the genuine apparel item, to reflect the change of ownership and transfer of the custody of the article and they associated NFT and public and private key to the new owner. In some embodiments, the private key allows the verification of the authenticity of the article against the NFT associated with the genuine apparel item. In some embodiments, a brand owner may provide assistance in processing transactions in the secondary market to maintain control of the secondary market for its products and discourage fraudulent transactions. In some embodiments, the brand owner may further discourage counterfeiting by limiting service, repair or post-purchase assistance to a custodian of an apparel article without the ability to authenticate the genuineness of the article and authentication of the custodian as the legitimate and legal owner of the article based on the provenance information of the apparel article as recorded in the distributed ledger associated to the NFT, public and private key and the article tag record information. For example, the identification tag may be printed on the apparel item using invisible ink. The identification tag includes tag data that uniquely identifies the apparel item. In some embodiments, the identification tag data uniquely identifies a genuine article of manufacture by associating the genuine article of manufacture to a non-fungible token and its corresponding record saved to a distributed ledger. In some embodiments, the tag data stored in the distributed ledger may be accessed for verification of the genuineness of the tag and the article of manufacture using a public key from a public key-private key set associated with the genuine article. In some embodiments, the authentication of an article of manufacture may be verified against an NFT associated to the genuine article as represented with the record stored in a distributed ledger and accessed using a private key from a private-public key set created by the manufacturer, brand owner, distributer, or customization agent. In some embodiments, the NFT representing the genuine article of manufacture may be created (minted) by the manufacturer, brand owner, distributor or a customization agent. In some embodiments, the creation of NFTs may be contracted to a third party entity. In some embodiments, verification of the tag data using a public key, or the verification of authenticity of an article of manufacture and the verification of the legal ownership of the custodian using a private key, and any recording of transactions or changes of ownership may be contracted to a third party.

At step S404, the apparel system 102 may generate a record of the apparel item in a distributed ledger. The record includes a copy of the tag data. According to various embodiments, the tag data may include information on one or more of a provenance, a location, an ownership, a date of first sale, a count of limited production articles, a first buyer information, or a transaction history associated with the apparel item. In some embodiments, the authenticity of an article and its provenance record may be checked by providing the related public key.

At step S406, the apparel system 102 may also generate an NFT associated with the apparel item on the distributed ledger record. The NFT may be associated with a private key showing used to confirm the ownership of the NFT and/or the physical apparel item associated with the NFT. In some embodiments, a signing transaction may be required by a brand owner of the possessor of an article prior to provision of any post sale services such as repairs or servicing. In some embodiments, a buyer in the secondary market may require a signing transaction to verify the true ownership and provenance of a genuine article, prior to moving forward with the purchase. In all these cases, the additional controls imposed by brand owners requiring authentication of the article and its ownership works to discourage the counterfeiting of their products. As described herein, the NFT may be coupled to the apparel item such that the NFT is sold or otherwise transferred along with the apparel item. According to some embodiments, the NFT may be sold or otherwise transferred on its own, separately from the apparel item. Such transfers for NFTs may occur on any suitable digital marketplaces (e.g. digital marketplace 310).

At step S408, a purchaser (e.g. owner_1 150) may purchase the apparel item along with the NFT. According to various embodiments, the purchaser may be the first owner of the apparel item from the manufacturing/distribution chain. If the purchaser is the first owner, the purchaser may receive the private key associated with the NFT from the apparel system 102. The public key associated with the private key (e.g. the public key component of the public-private key pair) may be controlled by, for example, the brand owner and the private key will be controlled by the private customer. The private key may be transferred to the purchaser/owner by being stored on a memory stick that is physically transferred to the purchaser, or by transmittal to an e-wallet, or a cloud storage of the purchaser. For example, the private key may be transmitted to a user device of the purchaser via Bluetooth, near field communication (NFC), or the like.

The purchaser may register the transaction with the distributed ledger 106. In some embodiments, when the NFT is transferred, the transaction may be automatically registered in the distributed ledger. That is, at each transaction, the nodes of the distributed ledger confirm the veracity of the transaction, and once confirmed, update the record of the apparel item on the distributed ledger (step S410). The record of the apparel item on the distributed ledger is updated at one or more steps in manufacturing or distribution processes to record one or more of a change of custody, a change of location, or a change of ownership.

According to some embodiments, the distributed ledger 106 may be a private distributed ledger managed or otherwise maintained by the manufacturer of the apparel item (e.g. the apparel system 102). In such embodiments, the manufacturer may have a control on the entities who joins the distributed ledger 106 and, as such, may have an indirect control on updating the record associated with the apparel item on the distributed ledger 106. When the owner/purchaser 150 would like to sell/transfer the apparel item and the NFT, or when the apparel item or the NFT needs to be authenticated, the identification tag on the apparel item may be scanned using a scanning system 104 that is configured to be able to scan and read a specific set of tags including the identification tag (step S412).

Upon scanning the tag, the scanning system 104 may acquire the tag data embedded in the tag. In some embodiments, the tag data may be encrypted. The scanning system 104 may then provide the tag data directly (or via the apparel system 102) to the distributed ledger 106 for confirmation and authentication (step S414).

At step S416, the nodes on the distributed ledger 106 may match the tag data received from the scanning system 104 to the tag data stored in the record associated with the apparel item on the distributed ledger. Once identified, the nodes may provide a response to the scanning system 104 based on the identified tag data. For example, the nodes may authenticate the apparel item and provide the authentication result as a response. Alternatively, the distributed ledger 106 may return part or entire tag data identified in the record associated with the apparel item to the scanning system 104. According to various embodiments, at step S418, the scanning system 104 may receive the response directly from the distributed ledger 106 or via the apparel system 102. The scanning system 104 may output the response received from the distributed ledger 106, thereby tracking and/or authenticating one or more of a location, a custody and an ownership information associated with the apparel item to the inquirer (step S420).

According to various embodiments, the distributed ledger may be managed/operated by a third party. Each transaction look up may incur a fee and require the use of special readers at authorized dealers. Each recordation of a transaction may incur a higher fee.

According to various embodiments, the apparel system 102 illustrated in FIG. 4 may be a manufacturing system operated by the manufacturer of the apparel item. Accordingly, the apparel system 102 may manufacture the apparel item prior to affixing the identification tag to the apparel item. In some embodiments, the apparel system 102 may print an inimitable identification tag to the apparel item using invisible ink. The identification tag includes tag data that uniquely identifies the apparel item. As described above, the identification tag may be a part of a set of identification tags that can only be read using a scanning system configured by the manufacturing system to read the set of identification tags. The apparel system 102 may generate a record of the apparel item in a distributed ledger, the record including. The record includes the tag data. The apparel system 102 may also generate a non-fungible token associated with the apparel item on the distributed ledger record, and transmit a private key of the non-fungible token to an actual owner of the apparel item, such as an individual who purchased the apparel item. The apparel system can provide for tracking of one or more of a location, a custody and an ownership information associated with the apparel item during or post manufacturing phase of the apparel item, thereby enable authenticating the apparel item throughout its lifetime.

Figure 5:
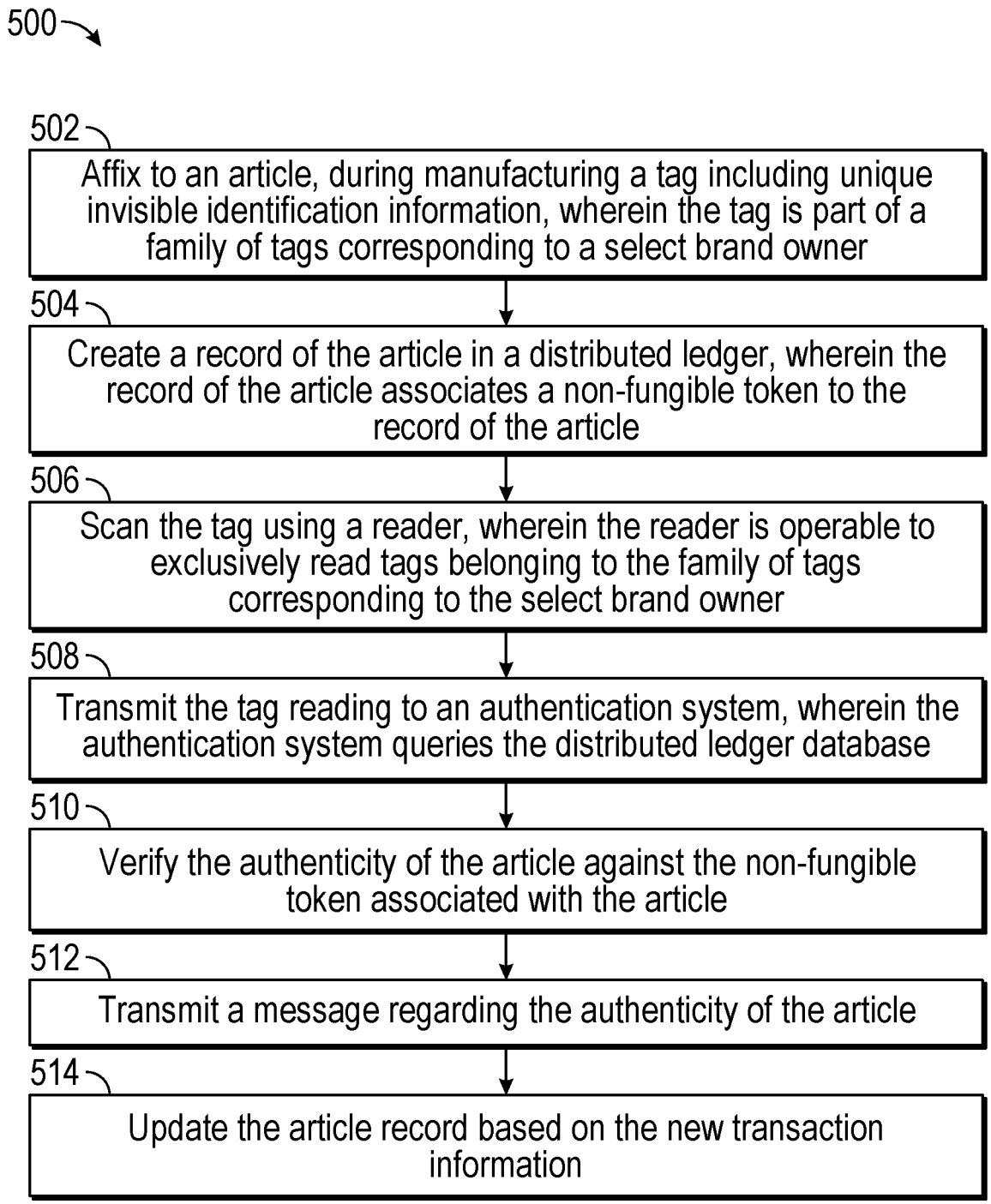
FIG. 5 illustrates an exemplary method for tracking and managing apparel items using distributed ledgers in accordance with some embodiments.

FIG. 5 illustrates another exemplary routine 500 of steps for managing scarcity and authenticity of apparel items using distributed ledgers in accordance with some embodiments. In block 502, routine 500 affixes to an apparel item, during manufacturing a tag including unique invisible identification information, wherein the tag is part of a family of tags corresponding to and associated with a select brand owner. In block 504, routine 500 creates a record of the apparel item in a distributed ledger, wherein the record of the apparel item associates a non-fungible token to the record of the apparel item. In block 506, routine 500 scans the tag using a reader, wherein the reader is operable to exclusively read tags belonging to the family of tags corresponding to the select brand owner. In block 508, routine 500 transmits the tag reading to an authentication system, wherein the authentication system queries the distributed ledger database. In block 510, routine 500 verifies the authenticity of the apparel item against the non-fungible token associated with the apparel item. In block 512, routine 500 transmits a message regarding the authenticity of the apparel item. In block 514, routine 500 updates the apparel item record based on the new transaction information.

Figure 6:
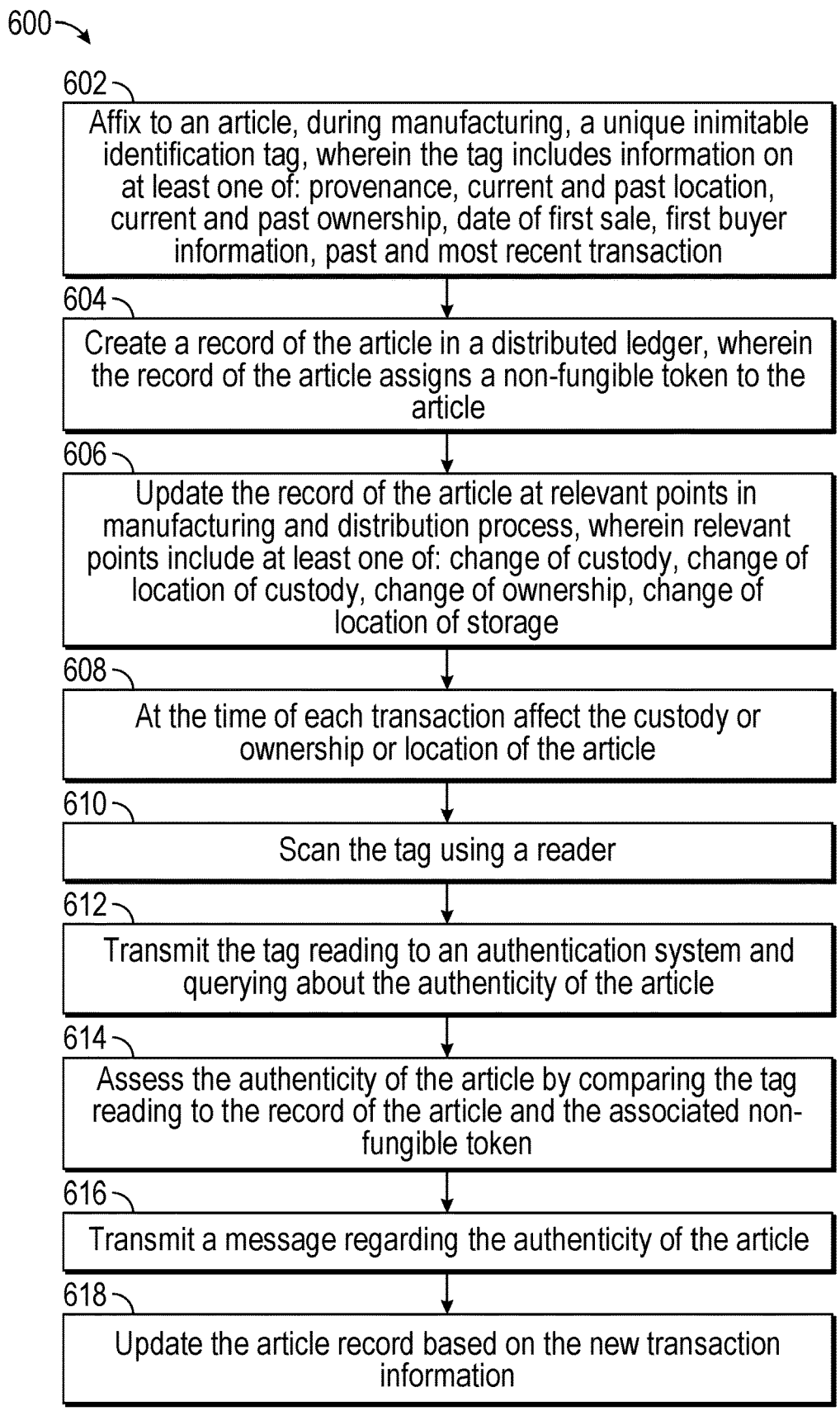
FIG. 6 illustrates a exemplary method for tracking and managing apparel items by a manufacturer using distributed ledgers in accordance with some embodiments.

FIG. 6 illustrates another exemplary routine 600 of steps for tracking and managing scarcity and authenticity of apparel items by a manufacturer using distributed ledgers in accordance with some embodiments. In block 602, routine 600 affixes to an apparel item, during manufacturing, a unique inimitable identification tag, wherein the tag includes information on at least one of: provenance, current and past location, current and past ownership, date of first sale, first buyer information, past and most recent transaction. In block 606, routine 600 creates a record of the apparel item in a distributed ledger, and assigns a non-fungible token to the apparel item on the distributed ledger record. In block 606, routine 600 updates the record at relevant points in manufacturing and distribution process, wherein relevant points include at least one of: change of custody, change of location of custody, change of ownership, change of location of storage. In block 608, routine 600 at the time of each transaction affects the custody or ownership or location of the apparel item. In block 610, routine 600 scans the tag using a reader. In block 612, routine 600 transmits the tag reading to an authentication system and querying about the authenticity of the apparel item. In block 616, routine 600 assesses the authenticity of the apparel item by comparing the tag reading to the record and the associated non-fungible token. In block 616, routine 600 transmits a message regarding the authenticity of the apparel item. In block 618, routine 600 updates the record based on the new transaction information.

Embodiments provide systems and methods that enable tracking an apparel item from its creation (e.g. manufacturing) throughout its lifetime. Embodiments generate a record for the apparel item on a distributed ledger, and assign a NFT to the apparel item and/or its digital representation. Information (e.g. creation date, manufacturer ID, apparel number, etc.) associated with the apparel item may be encoded (e.g. in an encrypted manner) in a tag affixed to the apparel item. At least a portion of the tag on the apparel item may be invisible to the naked human eye. According to various embodiments, the NFT and the apparel item may be assigned to a same entity (e.g. the entity who purchases the apparel item from a manufacturer, retailer, or another owner as a second-hand item). In other embodiments, the NFT may have its own in addition to the value of the apparel item. Both the NFT and the apparel item may derive their value from authenticity and scarcity associated with the NFT and the apparel item, respectively. As described above, any transaction (e.g. change of custody, change of ownership, licensing, or shared-ownership) associated with the apparel item may be recorded in the record of the apparel item on the distributed ledger. Therefore, it is possible to track, identify and authenticate the apparel item throughout its life.

Embodiments provide multiple layers of security and anti-counterfeiting protection using the systems and methods described above. A first layer among the multiple layers of security and anti-counterfeiting protection is provided by the invisible tag 202. The tag 202 also provides a second layer of security as it is inimitable and cannot be removed from the apparel item 200 without destroying the apparel item 200. A third layer of protection also provides decryption of the invisible tag which renders the tag undecipherable even if the invisible tag could be rendered visible by some means. A fourth layer of protection is provided by the tag reader that specifically programmed or otherwise configured to read the tag 202. The tag readers may be customized to match a single brand, or a group of brands. A fifth layer of protection is provided by the use of blockchain to record the transactions including the apparel item. A sixth layer of protection is provided by the use of an NFT associated with the article. The NFT links the blockchain record to the physical article. A seventh layer of protection is provided by the use of a private key in the custody of the legal owner of the apparel item. The private key is required for any update to entries about the apparel item in the blockchain. An eighth layer of protection is provided by the use of smart contracts and/or NFT to manage rights and/or tally royalties of the apparel item (e.g. when the apparel item is a scarce item that requires artist royalty for each genuine apparel item sold). A nineth layer of protection is provided by the use of the NFT to track the count of serial numbers associated with genuine apparel items, and to prevent fraud by counterfeiters or manufacturers. The layers of security provided by the embodiments may include a subset of these layers, or all layers at the same time. Embodiments may provide more or less security and anti-counterfeiting protection that the layers enumerated above. The numbering of the layers is not indicative of an order, and is simply provided for enumeration and illustration purposes. Different layers of security may become more or less important depending on the apparel item, the manufacturer, the user, etc. The processors described herein (e.g. first processor 116, second processor 132) may be any type of general or specific purpose processor. In some cases, the one or more processors may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

The one or more processors may perform functions associated with the operation of the garment manufacturing and distribution environment 100 which may include, for example, precoding of antenna gain/phase parameters, encoding and decoding of individual bits forming a communication message, formatting of information, and overall control of the entities of the garment manufacturing and distribution environment 100, including processes related to management of communication resources.

The memories described herein (e.g. first memory 118, second memory 134) may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 118 and/or memory 134 can include of any combination of random access memory (RAM), read only memory (ROM), static storage such as a magnetic or optical disk, hard disk drive (HDD), or any other type of non-transitory machine or computer readable media. The instructions stored in memory may include program instructions or computer program code that, when executed by one or more processors, enable the processors to perform tasks as described herein.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps.

Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments. Other embodiments may be involve specific embodiments relating to each individual aspect, or specific combinations of these individual aspects. The above description of exemplary embodiments has been presented for the purpose of illustration and description. It is not intended to be exhaustive or limiting to the precise form described, and many modifications and variations are possible in light of the teaching above. The embodiments were chosen and described in order to best explain the principles and practical applications described herein to thereby enable others skilled in the art to best utilize various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

What is claimed is:

1. A method for tracking and managing apparel items comprising:
    generating, by an apparel system, an inimitable identification tag that includes encrypted tag data that uniquely identifies an apparel item, wherein the identification tag is part of a set of identification tags that can only be read using a scanning system programmed to read the set of identification tags;
    configuring, by the apparel system, the scanning system to read the set of identification tags;
    printing, by the apparel system, the inimitable identification tag on the apparel item using invisible ink such that the identification tag includes a smart label that is irremovable without damaging the apparel item, wherein the invisible ink on the apparel item renders at least a portion of the identification tag invisible to naked human eye;
    generating, by the apparel system, a record of the apparel item in a distributed ledger, wherein the record includes the tag data, wherein the record of the apparel item on the distributed ledger is updated at one or more steps in manufacturing or distribution phases;
    generating, by the apparel system, a non-fungible token associated with the apparel item on the distributed ledger record;
    transmitting, by the apparel system, a private key of the non-fungible token to an actual owner of the apparel item;
    tracking, by the apparel system during and post a manufacturing phase of the apparel item, a location, a custody and an ownership information associated with the apparel item through the encrypted tag data incorporated in the identification tag printed on the apparel item, wherein the encrypted tag data is configured to be decrypted by only a reader associated with the apparel system;
    scanning, by the scanning system, the identification tag to acquire the encrypted tag data;
    decrypting, by the scanning system, the encrypted tag data using a predetermined decryption algorithm to obtain decrypted tag data;
    transmitting, by the scanning system, the decrypted tag data to the apparel system; and
    receiving, by the scanning system from the apparel system, information associated with authenticity of the apparel item based on the decrypted tag data.

2. The method of claim 1, wherein tag information coded in the identification tag is in form of a matrix bar code.

3. The method of claim 2, wherein the matrix bar code is a quick response (QR) code.

4. The method of claim 1 further comprising:
    maintaining, by the apparel system, the distributed ledger.

5. The method of claim 1, wherein the identification tag is affixed to the apparel item during a manufacturing phase of the apparel item.

6. The method of claim 1, wherein the tag data includes a count of the apparel item out of a total number of apparel items produced.

7. The method of claim 1, wherein the record includes information on one or more of a provenance, a location, an ownership, a date of first sale, a first buyer information, or a transaction history associated with the apparel item.

8. The method of claim 1, wherein the one or more steps in the manufacturing or distribution phases include at least one of a change of custody, a change of location, or a change of ownership.

9. A system for tracking and managing apparel items comprising:
    an apparel system comprising:
        a tagging system configured to:
            generate an inimitable identification tag that includes encrypted tag data that uniquely identifies an apparel item, wherein the identification tag is part of a set of identification tags that can only be read using a scanning system programmed to read the set of identification tags;
            configure the scanning system to read the set of identification tags; and
            print the inimitable identification tag on the apparel item using an invisible ink such that the identification tag includes a smart label that is irremovable without damaging the apparel item, wherein the invisible ink on the apparel item renders at least a portion the identification tag invisible to naked human eye; and
        a first processor and a first memory storing executable instructions that, when executed by the first processor, cause the first processor to:
            generate a record of the apparel item in a distributed ledger, wherein the record includes the tag data, wherein the record on the distributed ledger is updated at one or more steps in manufacturing or distribution processes;
            generate a non-fungible token associated with the apparel item on the distributed ledger record;
            transmit a private key of the non-fungible token to an actual owner of the apparel item; and
            track, during and post a manufacturing phase of the apparel item, a location, a custody and an ownership information associated with the apparel item through the encrypted tag data incorporated in the identification tag printed on the apparel item, wherein the encrypted tag data is configured to be decrypted by only a tag reader device paired with the tagging system; and the scanning system comprising:
    the tag reader device paired with the tagging system, the tag reader device configured to:
        scan the identification tag to acquire the encrypted tag data; and
    a second processor and a second memory storing executable instructions that, when executed by the second processor, cause the second processor to:
        decrypt the encrypted tag data using a predetermined decryption algorithm to obtain decrypted tag data;
        transmit the decrypted tag data to the first processor of the apparel system; and
        receive, from the apparel system, information associated with authenticity of the apparel item based on the decrypted tag data.

10. The system of claim 9, wherein tag information coded in the identification tag is in form of a quick response (QR) code, wherein the QR code includes the tag data in an encrypted format.

11. The system of claim 9, further configured to:
manufacture the apparel item, wherein the identification tag is printed on the apparel item during a manufacturing phase of the apparel item.

12. The system of claim 9, further configured to:
maintain the distributed ledger.

13. The system of claim 9, wherein the record includes information on one or more of a provenance, a location, an ownership, a date of first sale, a first buyer information, or a transaction history associated with the apparel item, and
    wherein the one or more steps in the manufacturing or distribution processes include at least one of a change of custody, a change of location, or a change of ownership.

14. A method for tracking and managing apparel items comprising:
    manufacturing, by a manufacturing system, an apparel item;
    generating, by the manufacturing system, an inimitable identification tag that includes encrypted tag data that uniquely identifies the apparel item;
    printing, by the manufacturing system, the inimitable identification tag on the apparel item using invisible ink that renders at least a portion of the identification tag invisible to naked human eye, wherein the identification tag includes a smart label that is irremovable without damaging the apparel item, wherein the identification tag is part of a set of identification tags that can only be read and decrypted using a scanning system configured by the manufacturing system to read and decrypt the set of identification tags;
    generating, by the manufacturing system, a record of the apparel item in a distributed ledger, wherein the record includes the tag data;
    generating, by the manufacturing system, a non-fungible token associated with the apparel item on the distributed ledger record;
    transmitting, by the manufacturing system, a private key of the non-fungible token to an actual owner of the apparel item;
    tracking, by the manufacturing system, a location, a custody and an ownership information associated with the apparel item during and post a manufacturing phase of the apparel item through the encrypted tag data incorporated in the identification tag printed on the apparel item;
    scanning, by the scanning system, the identification tag to acquire the encrypted tag data;
    decrypting, by the scanning system, the encrypted tag data using a predetermined decryption algorithm to obtain decrypted tag data;
    transmitting, by the scanning system, the decrypted tag data to the manufacturing system; and
    receiving, by the scanning system from the manufacturing system, information associated with authenticity of the apparel item based on the decrypted tag data.

\* \* \* \* \*